Figure 1:
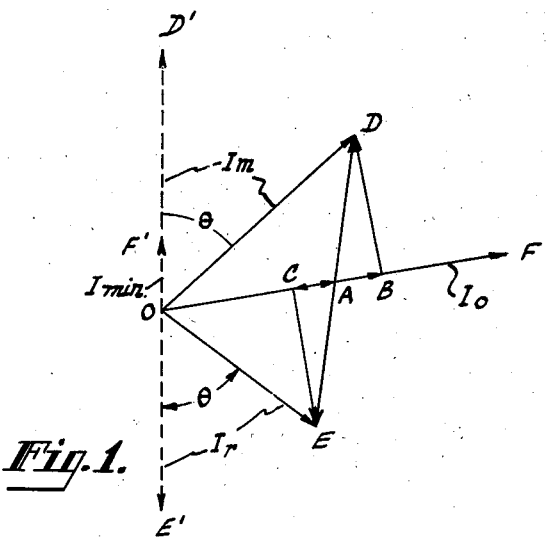

June 19, 1951  G. H. BROWN  2,557,811
IMPEDANCE MEASUREMENT AT ULTRA HIGH FREQUENCIES
Filed June 8, 1948

INVENTOR
GEORGE H. BROWN
BY Morrish Rubin
ATTORNEY

Patented June 19, 1951

2,557,811

UNITED STATES PATENT OFFICE 2,557,811

IMPEDANCE MEASUREMENT AT ULTRA HIGH FREQUENCIES

George Harold Brown, Princeton, N. J., assignor to Radio Corporation of America, a corporation of Delaware Application June 8, 1948, Serial No. 31,786

11 Claims. (Cl. 235—61)

This invention relates to impedance measurement at ultra-high frequencies, and more particularly to means for evaluating the effective value of the terminating impedance of a transmission line at ultra-high frequencies from observed data.

It is well known that ordinary low frequency measuring techniques are not adequate for determining the effective impedance of electrical circuits and devices at ultra-high frequencies. The measurement of impedance at such frequencies is usually accomplished by studying the standing waves established on a transmission line connected to the impedance to be measured. Determination of the unknown impedance is then made possible by the following considerations:

When a transmission line is used to transfer energy from a source to a load impedance other than the characteristic impedance of the line, standing waves of voltage and current are established on the line due to the interaction between main waves (denoted herein by the subscript $m$) traveling from the source to the load, and reflected waves (denoted herein by the subscript $r$) traveling from the load toward the source. To avoid confusion, the present analysis will refer only to standing or traveling waves of current, I, on the line, although it will be appreciated that similar considerations apply to voltage waves on the line.

For a particular line and a particular load, the ratio between the reflected traveling wave $I_r$ and the main traveling wave $I_m$ has a constant value $k$, usually referred to as the reflection coefficient for that line and load, and expressed as (1) $$k = \frac{I_r}{I_m}, \text{ or } I_r = kI_m$$

At points on the line where the main and reflected waves coincide in phase, their effects are additive, and a current maximum $I_{max}$ exists in the standing wave, so that (2) $$I_{max} = I_m + I_r$$

At points on the line where the main and reflected waves are in phase opposition, their effects are subtractive, and a current minimum exists, so that (3) $$I_{min} = I_m - I_r$$

The ratio between the current minimum $I_{min}$ and the current maximum $I_{max}$ is designated as the standing wave ratio R, and may be expressed as (4) $$R = \frac{I_{min}}{I_{max}}$$

It will be seen that Equations 2, 3, and 4 can be combined so that the relation of the standing wave ratio to the traveling waves may be expressed as (5) $$R = \frac{I_m - I_r}{I_m + I_r}$$

or (6) $$R = \frac{1 - I_r/I_m}{1 + I_r/I_m}$$

From Equations 1 and 6, the standing wave ratio R and reflection coefficient $k$ may also be correlated in the equation (7) $$R = \frac{1-k}{1+k}$$

or (8) $$k = \frac{1-R}{1+R}$$

From Equation 8, it is apparent that the reflection coefficient for a particular line and load can be determined from the standing wave ratio, which in turn may be ascertained from measured values of current maximums and current minimums on the line by Equation 4.

A further parameter which may be measured is the distance, X, between the load end of the line and the point at which the first current minimum occurs on the line. This distance X is some fractional part of a wavelength $\lambda$ for the frequency of the energy supplied by the source, and can be expressed as an angle $\theta$, which in radians will be (9) $$\theta = \frac{2\pi X}{\lambda}$$

or in degrees will be

(10) $$\theta = \frac{360 X}{\lambda}$$

The current $I_\theta$ at any point on the line, distant an angle $\theta$ from the load, can be expressed in terms of the load current, $I_0$, by the equation

(11) $$I_\theta = \frac{I_0}{2}\left(1 + \frac{R}{Z_c} + j\frac{X}{Z_c}\right)\epsilon^{+\theta} + \frac{I_0}{2}\left(1 - \frac{R}{Z_c} - j\frac{X}{Z_c}\right)\epsilon^{-\theta}$$

where

R = the load resistance
X = the load reactance
$Z_c$ = the characteristic impedance of the transmission line By making the load current equal 1, Equation 11 can be simplified to $$(12) \quad I_\theta = \frac{1}{2}\left(1 + \frac{R}{Z_c} + j\frac{X}{Z_c}\right)\epsilon^{+\theta} + \frac{1}{2}\left(1 - \frac{R}{Z_c} - j\frac{X}{Z_c}\right)\epsilon^{-\theta}$$

In Equation 12, the quantity $$(13) \quad \frac{1}{2}\left(1 + \frac{R}{Z_c} + j\frac{X}{Z_c}\right)\epsilon^{+\theta}$$

corresponds to the main wave of current $I_m$ on the line, while the quantity $$(14) \quad \frac{1}{2}\left(1 - \frac{R}{Z_c} - j\frac{X}{Z_c}\right)\epsilon^{-\theta}$$

corresponds to the reflected wave of current $I_r$ on the line.

It will be shown hereinafter that Equations 1 through 12 can be used with measured values of $I_{min}$, $I_{max}$, and $\theta$, together with the known value of $Z_c$ for a particular transmission line, to calculate the load impedance at the end of the line. However, these calculations are extremely laborious and time consuming, and although various charts or diagrams have been developed which will give the desired information from the same measured data, such devices are relatively unsatisfactory. The charts are usually quite complex, and where a large number of measurements are being made, the likelihood of error due to fatigue increases rapidly.

It is accordingly an object of the present invention to provide improved means for evaluating the terminating impedance of a transmission line.

Another object is to provide a simple electronic circuit which, when suitably adjusted, will automatically determine the resistance and reactance characteristics of the terminating impedance of a transmission line.

According to the invention, the foregoing and other objects and advantages are attained by means of a circuit in which voltages corresponding to observed standing wave data are developed. These voltages are then so combined as to produce resultants corresponding to the magnitude of the resistive and reactive components of the unknown impedance.

Figure 2:
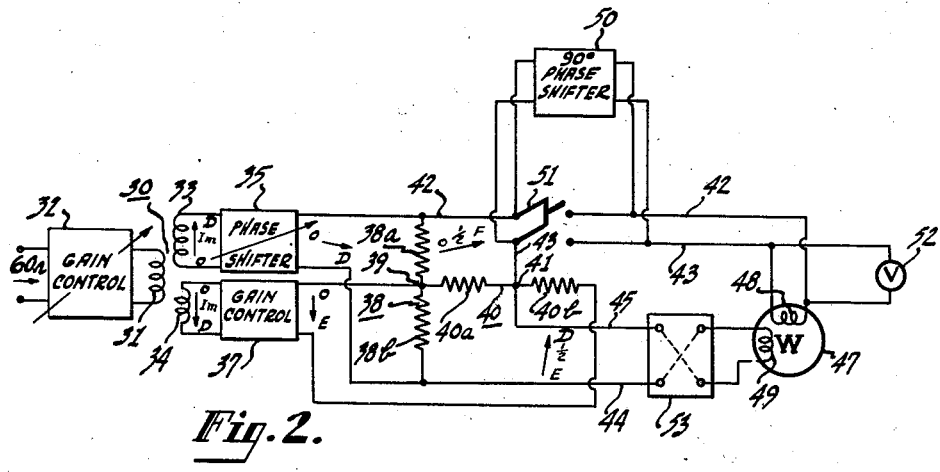

A more complete understanding of the invention may be had from the following description of an illustrative embodiment of the invention when read with the accompanying drawing in which:

Figure 1 is a vector diagram illustrating the relations between the traveling and standing waves on a transmission line for two points on the line, and Figure 2 illustrates a circuit in which voltages corresponding to the vectors of Figure 1 can be developed and suitably combined to give transmission line impedance information.

The system of impedance measurement according to the invention can best be explained by reference to a vector diagram showing the relations between the traveling and standing waves on a transmission line. Accordingly, in Figure 1 there is shown vectorially the main current wave, $I_m$, the reflected current wave, $I_r$, and the resultant standing waves of current $I_{min}$ and $I_0$ such as may exist at two points on a transmission line. The broken line vectors $OD'$ and $OE'$ represent, respectively, the main and reflected waves $I_m$ and $I_r$ as they would be related at a point of current minimum on the line, at some distance $X$ units (or $\theta$ degrees or radians) from the load end of the line. Since a point of current minimum is depicted by the broken line vectors $OD'$ and $OE'$, they are shown in phase opposition, and the resultant current $I_{min}$ in the standing wave at this point is shown by the broken-line vector $OF'$.

The solid line vectors $OD$ and $OE$ of Figure 1 represent the main and reflected waves $I_m$ and $I_r$ as they might be related at the load end of the line for a given unknown load, $R+jX$. The main wave vector $OD$ is shown retarded in phase by an angle $\theta$, while the reflected wave vector $OE$ is shown advanced in phase by an equal angle, from their respective positions at the point of current minimum. The vector sum of the main and reflected waves, corresponding to the load current $I_0$, is represented by the vector $OF$, while the vector difference between the main and reflected waves is represented by the vector $ED$.

In the following equations, vector characters which are underlined (such as $\underline{OA}$) will denote vector quantities, including magnitude and direction; vector characters which are not underlined (such as $OA$) will denote simply the magnitude of a vector; and vector characters appearing between vertical lines and underlined (such as $|\underline{OA}|$) will denote absolute magnitude of the vector.

From an inspection of Figure 1, it can be seen that the main current vector $OD$ is the resultant of three vectors $OA$, $AB$, and $BD$. It will be recalled that the quantity (13) of Equation 12 above corresponds to the main wave portion of Equation 12, and it can readily be shown that the elements $$\frac{1}{2}, \frac{R}{2Z_c}, \text{ and } \frac{X}{2Z_c}$$

of quantity (13) correspond, respectively, to the vectors $OA$, $AB$, and $BD$, of Figure 1. Thus, $$(15) \quad |\underline{OA}| = \frac{1}{2}$$

$$(16) \quad AB = \frac{R}{2Z_c}$$

$$(17) \quad BD = \frac{X}{2Z_c}$$

Similarly, the reflected current vector $OE$ is the resultant of three vectors $OA$, $AC$, and $CE$, which correspond, respectively, to the elements $$\frac{1}{2}, -\frac{R}{2Z_c}, \text{ and } -j\frac{X}{2Z_c}$$

in the quantity (14) of Equation 12 and hence $$(18) \quad AC = \frac{R}{2Z_c}$$

$$(19) \quad CE = \frac{X}{2Z_c}$$

Since Equation 12 was derived from Equation 11 by assuming that the load current $I_0$ was equal to unity, then the magnitude of the load current vector $OF$, which is the sum of the vectors $OD$ and $OE$, may also be assumed equal to unity or $$(20) \quad |\underline{OF}| = |\underline{OD} + \underline{OE}| = 1$$

Moreover, the difference between the vectors $OD$ and $OE$ of Figure 1, which is represented by the vector $ED$, may be expressed as $$(21) \quad \underline{ED} = \underline{OD} - \underline{OE} = \frac{R}{Z_c} + j\frac{X}{Z_c}$$

The magnitude of the vector ED can be expressed from Equation 21 as $$(22) \quad ED = \frac{\sqrt{R^2 + X^2}}{Z_c}$$

In view of Equations 14 through 21, it will be appreciated that an electrical system wherein the magnitude and "direction" of the vector segments OA, AB, BD, AC, and CE can be evaluated from the known magnitude and "direction" of vectors OD and OE for a given transmission line and load will provide directly the desired information as to the magnitude and reactance characteristic of the terminating impedance of the line.

Figure 2 of the drawing is a circuit diagram of a system of the foregoing type which will serve to illustrate the principles of the invention. In the circuit of Figure 2, there is shown a transformer 30 having its primary winding 31 connected to a suitable source of A. C. voltage, such as a 60 cycle line, through a gain control 32. It will be appreciated that the frequency of the source used with the circuit of Figure 2 bears no relation to the frequency of the wave used with the transmission line. The transformer 30 has two secondary windings 33 and 34 so wound that the voltages induced therein from the primary winding 31 at any instant, will be 180° out of phase with each other. The first secondary winding, 33, is provided with a variable phase shifter 35 so that the output voltage of this winding can be shifted in phase as desired. The other secondary winding 34 is provided with a gain control 37 so that the output voltage of the winding 34 can be adjusted in magnitude as desired.

The first secondary winding 33 of the transformer is connected through the variable phase shifter 35 to the opposite end terminals of a first voltage divider 38 consisting of a pair of equal resistors, 38a and 38b, while the other secondary winding 34 is connected through the secondary gain control 37 to the opposite terminals of a second voltage divider 40 consisting of a second pair of equal resistors 40a and 40b. The second voltage divider 40 has one of its terminals connected to the common terminal 39 of the resistors 38a and 38b of the first voltage divider 38, so that the two dividers together form a T network from which a first output voltage equal to ½ of the vector sum of input voltages applied across the dividers 38 and 40 may be obtained between the midpoint 41 of the second divider 40 and one end terminal of the first divider 38, while a second output voltage equal to ½ of the vector difference between the same input voltages may be obtained between the midpoint 41 of the second divider 40 and the other end terminal of the first divider.

A first pair of output leads 42 and 43 are connected to one terminal of the first divider 38 and the common terminal 41 of the second divider 40, respectively, while a second pair of output leads 44 and 45 are connected to the other terminal of the first divider 38 and the common terminal 41 of the second divider 40, respectively. Each of the pairs of output leads 42, 43, and 44, 45 is connected to a separate one of the two coils 48, 49 of a wattmeter type instrument 47, or of a dynamometer type voltmeter in which the two coils are brought out separately rather than being connected in series in the usual manner. With such connections, the wattmeter 47 will, of course, still give indications proportional to the product of the two voltages applied to the deflecting coils 48 and 49 and the cosine of the phase angle between those voltages. The first pair of output leads 42, 43 is connected to the deflecting coil 48 through a 90° phase shifter 50, which may be bypassed by suitable switching means 51 when desired; and the second pair of output leads 44, 45 are connected to the other deflecting coil 49 through a reversing switch 53. A voltmeter 52 is also connected across the first pair of output leads 42, 43 as shown.

The operation of the circuit of Figure 2 is as follows:

With an A. C. voltage applied to the primary winding 31 of the transformer 30, equal and opposite voltages are induced in the two secondary windings 33 and 34, which voltages may be considered as corresponding to $I_m$ in Figure 1, as is represented by the vectors OD placed next to the secondary windings in Figure 2. Assuming that the necessary observations have been made of the standing waves on a transmission line connected to an unknown impedance, and that the values of $k$ and $\theta$ have been determined from the observed data in the manner previously described, the secondary gain control 37 is so adjusted that the output voltage of the gain control is equal to $kI_m$ which, from Equation 1, is equal to $I_r$. The variable phase shifter 35 is next adjusted so that the voltage output of the phase shifter 35 will be retarded in phase by an angle of $2\theta$ degrees to simulate the two angles $\theta$ of Figure 1, and the output voltages of the phase shifter 35 and the gain control 37 therefore correspond in magnitude and relative "direction" to the solid line vectors OD and OE, respectively of Figure 1, as indicated by the vectors OD and OE, placed next to the phase shifter 35 and gain control 37 in Figure 2. These two voltages, corresponding to the vectors OD and OE, can now be combined in the T network as previously described, so that the voltage $$\frac{"OF"}{2}$$

between output leads 42 and 43 will be ½ of the vector sum of the input voltages "OD" and "OE," corresponding to ½ of the vector OF of Figure 1, while the voltage $$\frac{"ED"}{2}$$

between the output leads 44 and 45 will be ½ of the vector difference between the input voltages "OD" and "OE," corresponding to ½ of the vector ED of Figure 1.

Since the two output voltages $$\frac{"OF"}{2} \text{ and } \frac{"ED"}{2}$$

of the T network are each equal in magnitude to one half of their corresponding vectors OF and ED, and since the phase angle between these voltages is the same as the angle between their associated vectors, then suitable combinations of these voltages will give resultants which are proportional to the resultants of similar combinations of the corresponding vectors.

Assuming, first, that the 90° phase shifter 50 is shunted out of the circuit by the switch 51, then the voltages applied to the deflecting coils 48 and 49 of the wattmeter 47 will be the output voltages $$\frac{"OF"}{2} \text{ and } \frac{"ED"}{2}$$

of the T network, and the wattmeter deflection will then be proportional to the product of the vectors OF, ED, and the cosine of the angle DAB between them. It will be noted, in Figure 1, that the tangent of the angle DAB is $$\frac{BD}{AB}$$

which, from Equations 16 and 17, may be expressed as $$\frac{X}{R}$$

The cosine of angle DAB will accordingly be $$\frac{R}{\sqrt{R^2+X^2}}$$

and from this relation, and from Equations 20 and 22, the wattmeter deflection will be proportional to $|OF| \cdot |ED| \cdot \cos \angle DAB$ or, $$1 \cdot \frac{\sqrt{R^2+X^2}}{Z_c} \cdot \frac{R}{\sqrt{R^2+X^2}}$$

which is equal to $$\frac{R}{Z_c}$$

Next, with the 90° phase shifter 50 switched into the circuit, the voltage $$\frac{"OF"}{2}$$

will be shifted in phase so that the wattmeter deflection will now be proportional to $$|OF| \cdot |ED| \cdot \cos \angle (DAB - 90°)$$

or $$|OF| \cdot |ED| \cdot \sin \angle DAB$$

Since $$\sin \angle DAB = \frac{X}{\sqrt{R^2+X^2}}$$

the deflection of the wattmeter will be proportional to $$1 \cdot \frac{\sqrt{R^2+X^2}}{Z_c} \cdot \frac{X}{\sqrt{R^2+X^2}}$$

which is equal to $$\frac{X}{Z_c}$$

If the wattmeter 47 reads backward when the 90° phase shifter 50 is switched into the circuit, this means that the reactance X is negative in character, and the switch 53 can then be reversed to cause the wattmeter to deflect in the proper direction by an amount proportional to $$\frac{X}{Z_c}$$

In any event, since the value of $Z_c$ for the particular line being used is known, the magnitude of the resistive and the reactive components of the unknown can be readily determined.

Before any readings are taken with unknown impedances, it is first necessary to calibrate the instrument from readings taken with known impedances on the particular line to be used, and this may be done by means of the primary gain control 32 and the voltmeter 52. This makes it possible to scale the wattmeter 47 directly in ohms, with all factors of proportionality in the foregoing procedure automatically taken care of.

It will be appreciated that the simple wattmeter type instrument 47 shown in the above circuit could be replaced by other measuring devices operating in a similar manner, such as recording instruments and the like, or that the output voltages $$\frac{"OF"}{2} \text{ and } \frac{"ED"}{2}$$

could be supplied to a suitable system for automatically adjusting the load on a transmission line. Since these and many other changes could be made in the circuit shown and described, all within the scope and spirit of the invention, the foregoing is to be construed merely as illustrative and not in a limiting sense.

What is claimed is:

1. In a device for evaluating the impedance of a load on a transmission line from observed standing and traveling wave data for said line, the combination of a source of A. C. voltage, means for deriving from said source a first pair of voltages which correspond in magnitude and phase to the main and reflected traveling waves existing on said line at said load, means for deriving from said first pair of voltages a second pair of voltages which are proportional to the vector sum of and the vector difference between said first pair of voltages, and measuring means calibrated in impedance units for measuring the product of (1) the magnitudes of said second pair of voltages and (2) a factor proportional to the phase angle between said second pair of voltages.

2. In a device for evaluating the resistance and reactance characteristics of the load on a transmission line from observed standing and traveling wave data for said line, in combination, a source of A. C. voltage, means for deriving from said source a first voltage and a second voltage, phase shifting means for adjusting the phase angle between said first and second voltages to correspond to the phase angle between the main and reflected traveling waves on said line at the load end thereof, means for adjusting the relative magnitudes of said first and second voltages to be proportional to the relative magnitudes of said main and reflected traveling waves, respectively, means for deriving from said first and second voltages (1) a third voltage proportional to the vector sum of said first and second voltages and (2) a fourth voltage proportional to the vector difference between said first and second voltages, and means for measuring the product of the magnitudes of (1) said third voltage, (2) said fourth voltage and (3) a factor proportional to the phase angle between said third and fourth voltages.

3. In a device for evaluating the resistance and reactance characteristics of the load on a transmission line from observed standing and traveling wave data for said line, in combination, a source of A. C. voltage, means for deriving from said source a first pair of voltages which correspond in magnitude and phase to the main and reflected traveling waves existing on said line at said load, means for deriving from said first pair of voltages (1) a first resultant voltage proportional to the vector sum of said pair of voltages and (2) a second resultant voltage proportional to the vector difference between said pair of voltages, and measuring means calibrated in impedance units for measuring and indicating the product of the magnitudes of (1) said first resultant voltage, (2) said second resultant voltage and (3) either the sine or the cosine of the phase angle between said resultant voltages.

4. In a device for evaluating the resistance and reactance characteristics of the load on a transmission line from observed standing and traveling wave data for said line, in combination, a source of A. C. voltage, means for deriving from said source a first pair of voltages which correspond in magnitude and phase to the main and reflected traveling waves existing on said line at said load, means for deriving from said first pair of voltages (1) a first resultant voltage proportional to the vector sum of said pair of voltages and (2) a second resultant voltage proportional to the vector difference between said pair of voltages, means for selectively shifting the phase of said first resultant voltage by 90°, and means for measuring and indicating the product of (1) the magnitudes of said resultant voltages and (2) a factor proportional to the phase angle between said resultant voltages.

5. In a device for evaluating the impedance of a load on a transmission line from observed standing and traveling wave data for said line, the combination of a source of A. C. voltage, means for deriving from said source a first voltage and a second voltage, phase shifting means for adjusting the phase angle between said first and second voltages to correspond to the phase angle between the main and reflected traveling waves on said line at the load end thereof, means for adjusting the relative magnitudes of said first and second voltages to be proportional to the relative magnitudes of said main and reflected traveling waves, respectively, means for deriving from said first and second voltages (1) a third voltage proportional to the vector sum of said first and second voltages and (2) a fourth voltage proportional to the vector difference between said first and second voltages, means for selectively shifting the phase of said third voltage by 90°, and means for measuring the product of (1) the magnitude of said third voltage, (2) the magnitude of said fourth voltage and (3) a factor proportional to the phase angle between said third and fourth voltages.

6. In a device of the type described, in combination, a transformer having a primary winding and first and second secondary windings, means for varying the relative magnitude and phase of voltages induced in said secondary windings from said primary winding, means for deriving from said induced voltages a pair of voltages which are proportional to the vector sum of and the vector difference between said induced voltages, and means for measuring the product of (1) the magnitudes of said pair of voltages and (2) a factor proportional to the phase angle between said pair of voltages.

7. In a device of the type described, in combination, a transformer having a primary winding and first and second secondary windings, a source of A. C. voltage for said transformer, means for varying the phase of the output voltage of said first secondary winding with respect to the output voltage of said second secondary winding, means for varying independently the magnitude of the voltage across said second secondary winding, means for deriving from said output voltages a pair of voltages which are proportional to the vector sum of and the vector difference between said output voltages, and means for measuring the product of (1) the magnitudes of said pair of voltages and (2) a factor proportional to the phase angle between said pair of voltages.

8. In a device of the type described, in combination, a transformer having a primary winding and first and second secondary windings, a source of A. C. voltage for said transformer, means for varying the phase of the output voltage of said first secondary winding with respect to the output voltage of said second secondary winding, means for varying independently the magnitude of the voltage across said second secondary winding, a first pair of series-connected equal resistors connected in parallel with said first secondary winding, a second pair of series-connected equal resistors connected in parallel with said second secondary winding and having one end terminal connected to the common terminal of said first pair of resistors, means for measuring the product of (1) the magnitude of the voltages between the common terminal of said second pair of resistors and the end terminals of said first pair of resistors and (2) a factor proportional to the phase angle between the voltages between the common terminal of said second pair of resistors and the end terminals of said first pair of resistors.

9. In a device of the type described, in combination, a transformer having a primary winding and first and second secondary windings, a source of A. C. voltage for said transformer, means for varying the phase of the output voltage of said first secondary winding with respect to the output voltage of said second secondary winding, means for varying independently the magnitude of the voltage across said second secondary winding, a first pair of series-connected equal resistors connected in parallel with said first secondary winding, a second pair of series-connected equal resistors connected in parallel with said second secondary winding and having one end terminal connected to the common terminal of said first pair of resistors, a two-coil measuring instrument, connections from one terminal of said first pair of resistors and from the common terminal of said second pair of resistors to one of the coils of said measuring instrument, and connections from the other terminal of said first pair of resistors and from the common terminal of said second pair of resistors to the other coil of said instrument.

10. In a device of the type described, in combination, a transformer having a primary winding and first and second secondary windings, a source of A. C. voltage for said transformer, means for varying the phase of the output voltage of said first secondary winding with respect to the output voltage of said second secondary winding, means for varying independently the magnitude of the voltage across said second secondary winding, a first pair of series-connected equal resistors connected in parallel with said first secondary winding, a second pair of series-connected equal resistors connected in parallel with said second secondary winding and having one end terminal connected to the common terminal of said first pair of resistors, a two-coil measuring instrument, connections from one terminal of said first pair of resistors and from the common terminal of said second pair of resistors to one of the coils of said measuring instrument, connections from the other terminal of said second pair of resistors to the other coil of said instrument, means for selectively shifting by 90° the phase of voltage to be applied to said first coil, and means for reversing the polarity of voltage to be supplied to said instrument through said second coil.

11. In a device of the type described, in combination, a transformer having a primary winding and first and second secondary windings so wound that the voltage induced in said first secondary winding from said primary winding is 180° out of phase with the voltage induced in said second secondary winding from said primary winding, a source of A. C. voltage for said transformer, means for varying the phase of the output voltage of said first secondary winding with respect to the output voltage of said second secondary winding, means for varying independently the magnitude of the voltage across said second secondary winding, a first pair of series-connected equal resistors connected in parallel with said first secondary winding, a second pair of series-connected equal resistors connected in parallel with said second secondary winding and having one end terminal connected to the common terminal of said first pair of resistors, a two-coil measuring instrument, connections from one terminal of said first pair of resistors and from the common terminal of said second pair of resistors to one of the coils of said measuring instrument, connections from the other terminal of said first pair of resistors and from the common terminal of said second pair of resistors to the other coil of said instrument, means for selectively shifting by 90° the phase of voltage to be applied to said first coil, and means for reversing the polarity of voltage to be supplied to said instrument through said second coil.

GEORGE HAROLD BROWN.

REFERENCES CITED

The following references are of record in the file of this patent:

UNITED STATES PATENTS

| Number | Name | Date |
|---|---|---|
| 1,586,533 | Peterson | June 1, 1926 |
| 1,596,942 | Nyquist | Aug. 24, 1926 |
| 1,684,403 | Mason | Sept. 18, 1928 |
| 2,070,668 | Sundry | Feb. 16, 1937 |
| 2,281,995 | Purington | May 5, 1942 |
| 2,316,153 | Brown | Apr 13, 1943 |
| 2,433,237 | Rajchman et al. | Dec. 23, 1947 |